United States Patent
Janson et al.

(10) Patent No.: US 6,668,995 B2
(45) Date of Patent: Dec. 30, 2003

(54) VARIABLE INERTIA FLYWHEEL

(75) Inventors: David Allen Janson, Plymouth, MI (US); Gregory Daniel Goleski, Warren, MI (US); John Matthew Ginder, Plymouth, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,800

(22) Filed: May 14, 2002

(65) Prior Publication Data

US 2003/0213672 A1 Nov. 20, 2003

(51) Int. Cl.[7] ................................. F16F 15/16
(52) U.S. Cl. ................ 192/55.4; 192/30 V; 192/201; 192/208
(58) Field of Search ............... 192/30 V, 201, 192/55.4, 55.61, 208; 464/2, 1, 62; 74/574

(56) References Cited

U.S. PATENT DOCUMENTS

| | | | |
|---|---|---|---|
| 4,624,351 A | * 11/1986 | Lutz et al. | 192/30 V |
| 4,638,684 A | * 1/1987 | Maucher | 74/574 |
| 4,813,295 A | * 3/1989 | Drexl et al. | 192/30 V |
| 4,856,636 A | * 8/1989 | Meinhard | 192/201 |
| 5,007,303 A | * 4/1991 | Okuzumi | 74/573 F |
| 5,245,889 A | * 9/1993 | Kohno et al. | 74/574 |
| 5,678,460 A | * 10/1997 | Walkowc | 74/574 |
| 5,711,191 A | * 1/1998 | Mokdad et al. | 74/574 |
| 5,720,475 A | * 2/1998 | Duclos | 192/201 |
| 5,762,557 A | * 6/1998 | Chazot et al. | 464/62 |
| 5,816,924 A | * 10/1998 | Kajitani et al. | 192/201 |
| 5,823,880 A | * 10/1998 | Kajitani et al. | 192/201 |
| 6,050,380 A | * 4/2000 | Peinemann et al. | 192/55.4 |
| 6,287,205 B1 | * 9/2001 | Bonfilio et al. | 74/574 |

FOREIGN PATENT DOCUMENTS

| | | | |
|---|---|---|---|
| DE | 299 21 011 U1 | * | 4/2000 |
| FR | 2 815 686 A1 | * | 4/2002 |
| WO | WO 94/27062 A1 | * | 11/1994 |

OTHER PUBLICATIONS

Schulte, L. F., Dual Mass Flywheels, Feb. 1986.

* cited by examiner

*Primary Examiner*—Rodney H. Bonck

(57) ABSTRACT

A variable inertia flywheel and clutch assembly having a primary flywheel mass rotationally fixed to an engine crankshaft and a secondary flywheel mass selectively engageable with a clutch disc, which is rotationally fixed to a transmission input shaft. A radial spring assembly is coupled between the primary mass and the secondary mass, as well as a latching assembly that can latch to selectively prevent relative rotation between the primary mass and the secondary mass. Preferably, the latching assembly is also employed as a variable damper between the primary mass and the secondary mass when the latching assembly is not latched.

12 Claims, 6 Drawing Sheets

VARIABLE INERTIA FLYWHEEL

BACKGROUND OF INVENTION

The present invention relates to flywheels employed in the drivetrain of vehicles, and more particularly to dual mass flywheels.

Conventional vehicle drivetrains regularly employ a flywheel between a vehicle engine and clutch in order to reduce the engine pulsations from propagating throughout the vehicle driveline. When the clutch is engaged, the flywheel also helps to improve noise, vibration and harshness (NVH) characteristics for the transmission as well. However, with the smaller engines that are now being used and the ever increasing demands to improve vehicle NVH characteristics, the single mass flywheel has proven to be inadequate to address these NVH concerns for both the engine and the transmission. One of the reasons for this is that a smaller engine, such as a three or four cylinder engine, generally requires a higher relative inertia in order to achieve effective vibration isolation than does a larger engine, such as a six or eight cylinder engine.

As a result, some have employed dual mass flywheels connected to the engine and the clutch. While these types of flywheels generally improve the transmission NVH, they generally reduce the effectiveness of the flywheel in improving the NVH of the engine. In these dual mass flywheels, a primary flywheel mass is connected directly to the engine crankshaft, while a secondary mass is connected to the primary mass via a spring and damper assembly. The primary flywheel mass has lower inertia than that of a conventional flywheel, and so is less effective in reducing transmission of the engine pulsations since the pulsations are reduced only by the inertia connected directly to the engine crankshaft. This increase in the engine NVH can lead to increased wear on the crankshaft or damage to accessories driven off of the front end accessory drive. As a result, those employing dual mass flywheels end up adding additional damper assemblies and friction plates to account for the engine NVH concerns.

Further, with the smaller engines, there is a also desire to reduce the engine rotating inertia in order to improve the vehicle launch. Thus, it is desirable to have a vehicle driveline that overcomes the drawbacks of current vehicle drivelines. In particular, it is desirable to have a flywheel and clutch assembly that will adequately reduce the NVH characteristics from both the engine and transmission, while also allowing for improved vehicle launch.

SUMMARY OF INVENTION

In its embodiments, the present invention contemplates a flywheel and clutch assembly for transferring torque from an engine crankshaft to a transmission input shaft. The assembly includes a primary mass adapted to be rotationally fixed to the engine crankshaft, a clutch disc adapted to be rotationally fixed to the transmission input shaft, and a secondary mass rotationally engageable with the clutch disc for transferring torque thereto. A spring assembly is coupled between the primary mass and the secondary mass, and a latcher is connected between the primary mass and the secondary mass that is engageable to rotationally fix the primary mass to the secondary mass.

According to an embodiment of the invention, it has a variable inertia flywheel where a primary mass and a secondary mass can be coupled together via a spring or a spring and damper assembly under certain vehicle driving conditions, but can also be latched together to rotate as one mass under other vehicle driving conditions.

An advantage of an embodiment of the present invention is that the flywheel and clutch assembly will adequately reduce the NVH for both the engine and the transmission.

Another advantage of an embodiment of the present invention is that the vehicle will have improved vehicle launch characteristics.

A further advantage of an embodiment of the present invention is that a mechanism employed to latch a primary and secondary mass together under certain driving conditions can also operate as a variable damper between the primary and secondary masses under other driving conditions.

DETAILED DESCRIPTION

Figure 1:
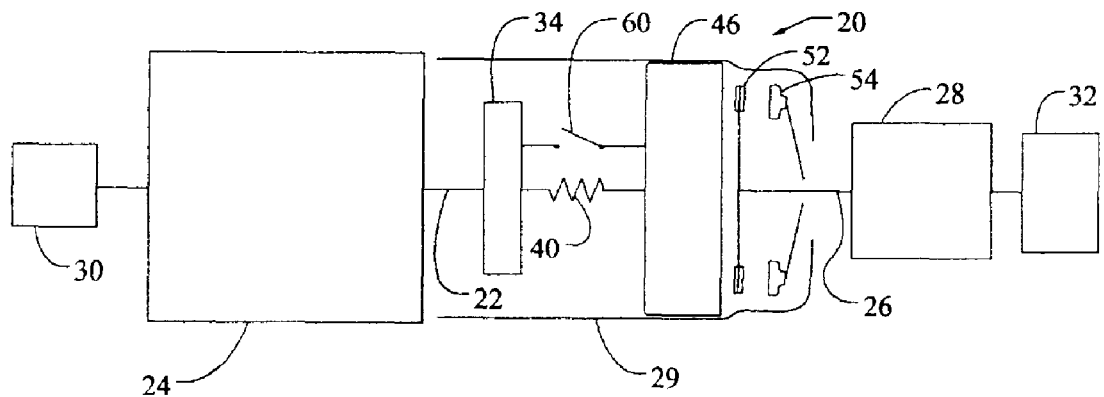
FIG. 1 is a schematic diagram of a vehicle drive train in accordance with a first embodiment of the present invention.

FIGS. 1–5 illustrate a flywheel and clutch assembly 20 in accordance with a first embodiment of the present invention. One will note that, since the rotating components discussed herein are generally symmetrical about the main axis of rotation 21, FIGS. 2–5 illustrate only one half of each of the rotating components. The assembly 20 is connected at a front end to a crankshaft 22 of an engine 24, and at the other end to an input shaft 26 of a transmission 28 (or transaxle), and is generally enclosed in a clutch housing 29. The crankshaft 22 typically also connects to and drives a front end accessory drive 30. The output of the transmission 28 will drive the remainder of the vehicle driveline 32, which can vary greatly depending upon whether the vehicle is front or rear wheel drive, among other factors, but is generally conventional and so will not be discussed further.

A primary flywheel mass 34 is secured to the crankshaft 22. This primary mass 34 is significantly smaller than what is conventionally used in a single mass flywheel assembly. The primary mass 34 includes a hub portion 36, which is bolted to the crankshaft 22, and an outer disc shaped portion 38 that is mounted to the hub portion 36.

Figure 3:
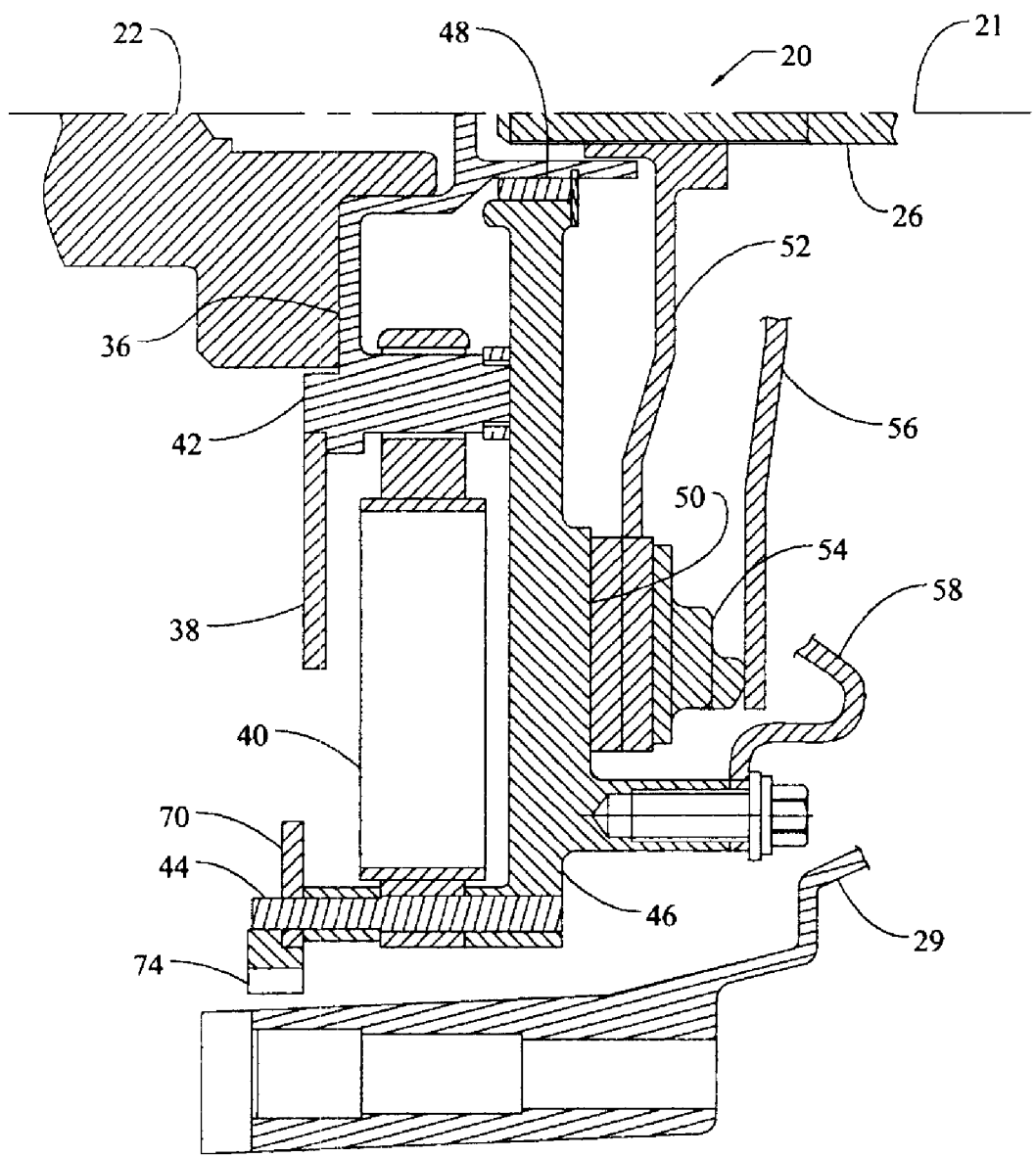
FIG. 3 is a view similar to FIG. 2, but illustrating a different portion of the assembly.
Figure 4:
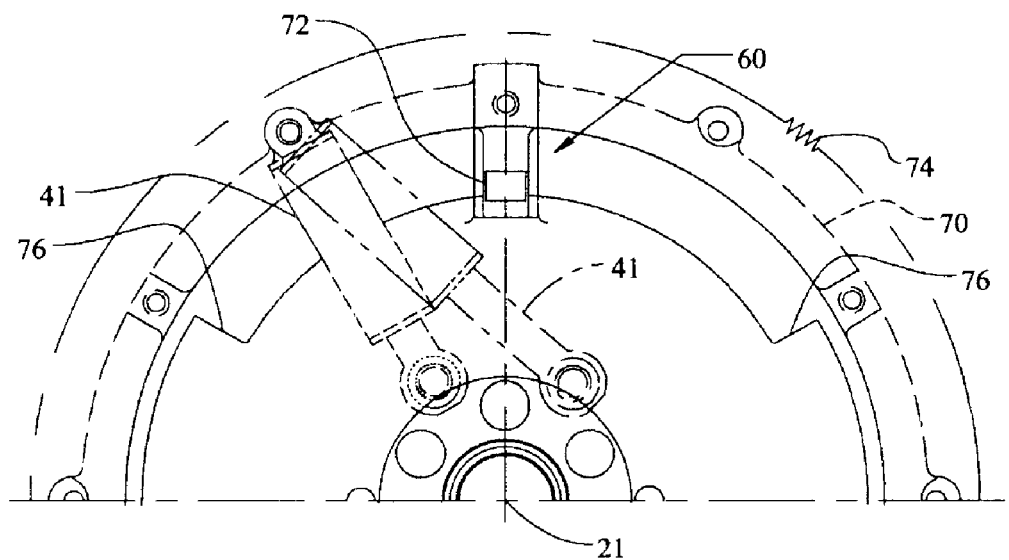
FIG. 4 is an elevation view of a portion of a radial spring and centrifugal latch assembly in accordance with the first embodiment of the present invention.

As can best be seen in FIGS. 3 and 4, the hub portion 36 is also mounted to the radially inner ends of a set of radial spring assemblies 40 via a first set of drive pins 42. There are preferably six radial springs 41 (only one of which is shown in FIG. 4). A second set of drive pins 44 mount the radially outer ends of the radial spring assemblies 40 to a secondary flywheel mass 46. The radially inner portion of the secondary mass 46 mounts about the hub portion 36 via a bearing 48. This bearing 48 allows for relative rotation between the hub portion 36 and the secondary mass 46. The primary mass 34 preferably has a significantly smaller rotational inertia than the secondary mass 46. The primary mass, for example, may be on the order of ten to twenty percent of the rotational inertia of the secondary mass 46. So the difference in inertia may be on the order of 0.1 Newton-meter-(seconds)-squared.

The secondary mass 46 also includes a friction face 50, which is shaped to engage with a face of a clutch disc assembly 52. This clutch disc assembly 52 is mounted to the transmission input shaft 26. The clutch disc assembly 52 also includes a face that can be selectively engaged with pressure plate 54. A pressure plate cover assembly 58 and clutch applying spring 56 act to engage and disengage the clutch, and are actuated by a clutch release mechanism (not shown). The clutch release mechanism can be any of a number of configurations, and can be mechanically, electrically, and/or hydraulically controlled as are known to those skilled in the art, and so will not be discussed further.

Figure 2:
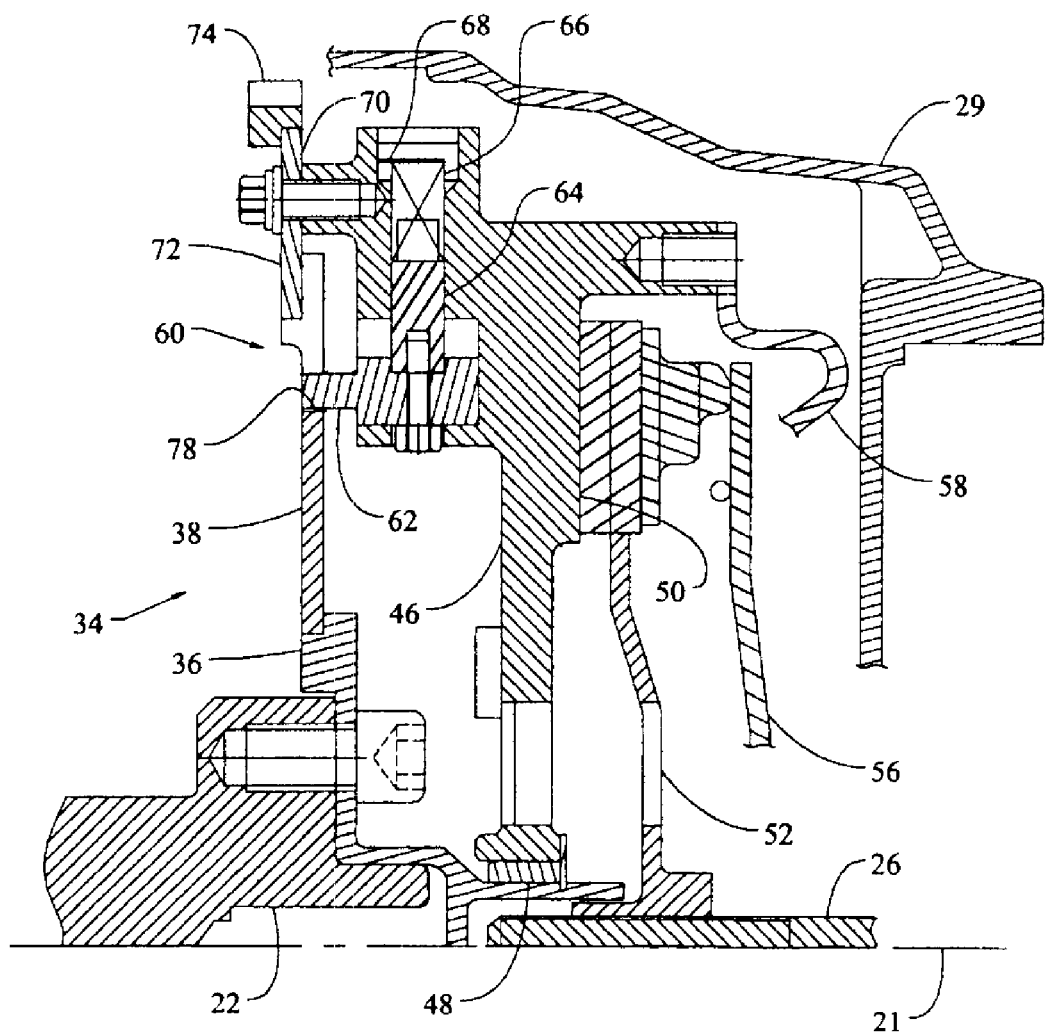
FIG. 2 is a partial cross-sectional view of a flywheel and clutch assembly in accordance with the first embodiment of the present invention.
Figure 5:
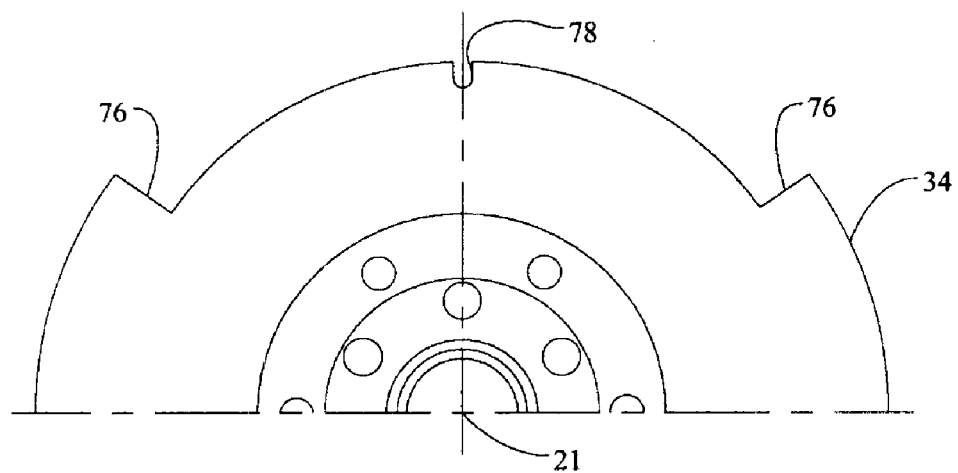
FIG. 5 is an elevation view of a primary mass of a flywheel in accordance with the first embodiment of the present invention.

As can best be seen in FIGS. 2, 4 and 5, the secondary mass 46 also supports a pair of centrifugal latching mechanisms 60, (one shown and the other located 180 degrees from the first). Each mechanism includes a latching pin 62, which is mounted in a cavity formed by the secondary mass 46, and is bolted to a radially oriented plunger 64, which can slide in a channel formed by the secondary mass 46. The radially outer end of the plunger 64 abuts a radially oriented spring 66, which is also mounted in the channel and held in place by a spring cap and snap ring assembly 68. The spring 66 is sized to press against the plunger 64, thus biasing the latching pin 62 radially inward.

Bolted to, and forming a portion of the secondary mass is a ring shaped member 70. This member 70 includes a pair of rotational stops 72, which are located on its inner periphery adjacent to the latching mechanisms 60, and a set of gear teeth 74, which are located about its outer periphery and can be engaged with a starter motor (not shown) in order to start the vehicle engine 24. Since the primary flywheel mass 34 is small (which has benefits as discussed herein), it would be difficult to locate the gear teeth 74 on the primary mass 34 where the teeth 74 could easily engage a starter motor. But, since the secondary flywheel mass 46 is latched to the primary mass 34 when the engine is off, the gear teeth 74 on the secondary mass 46 can be engaged by a starter motor to drive the crankshaft 22 while starting the engine 24, just as with a conventional single mass flywheel assembly.

The rotational stops 72 on the ring shaped member 70 are located to engage rotational travel stops 76 on the primary mass 34. There are four travel stops 76, which are located about the periphery of the primary mass 34 to limit the rotation of the secondary mass 34 relative to the primary mass 46 to about sixty degrees in either direction. (FIG. 4 illustrates a radial spring 41, shown in phantom, as it is oriented when the secondary mass 46 is rotated sixty degrees relative to the primary mass 34.) These travel stops 76 protect the springs within the radial spring assemblies 40 from being damaged due to overtravel.

The primary mass 34 includes a pair of latching slots 78, each one aligned with a corresponding one of the latching pins 62 when the radial spring assemblies 40 are in their centered, i.e. zero degree, positions. (FIG. 4 illustrates a radial spring 41, shown with solid lines, as it is oriented with zero degrees of rotation between the secondary mass 46 and the primary mass 34.)

The operation of the flywheel and clutch assembly 20 will now be described. Under all engine operating conditions, the torque from the crankshaft 22 is passed directly to the primary mass 34. If the engine RPMs are below a predetermined level, then the spring force from the radially oriented springs 66 will exceed the centrifugal force generated by the latching pins 62 and plungers 64, forcing the latching pins 62 to slide radially inward into their respective latching slots 78. The centrifugal latch mechanism 60 is now in its latched position, preventing the secondary mass 46 from rotating relative to the primary mass 34. When the centrifugal latch mechanism 60 is in its latched position, the torque is transferred directly from the primary mass 34 to the secondary mass 46, without the radial spring assemblies 40 transferring any torque. The secondary mass 46 passes the torque to the clutch disc assembly 52 (assuming the clutch is engaged), which passes the torque directly to the transmission input shaft 26. Since the secondary mass 46 is latched to and rotates with the primary mass, the two masses 34, 46 act as if there were just one larger inertia mass connected to the crankshaft 22. This larger effective inertia on the crankshaft 22, then, helps to stabilize the engine 24 at idle and low RPM conditions.

Above the predetermined engine RPM level, the centrifugal force generated by the latching pins 62 and plungers 64 will exceed the spring force from the radially oriented springs 66. This will force the latching pins 62 to slide radially outward out of their respective latching slots 78. The centrifugal latch mechanism 60 is now in its unlatched position, allowing the secondary mass 46 to rotate relative to the primary mass 34. The torque is now transferred from the primary mass 34 to the secondary mass 46 via the radial spring assemblies 40. The radial spring assemblies 40, then, isolate the primary mass 34 from the secondary mass 46. Since the primary mass 34 is much smaller than is usually required due to the coupling of the secondary mass 46 at low RPMs, the engine rotating inertia is reduced, thus allowing for improved vehicle launch. Moreover, even though there is less mass to reduce the effects of the engine pulsations, they do not create as much of a problem at these higher engine RPMs. And, the larger secondary mass 46 is still rotationally fixed (assuming the clutch is engaged) to the transmission input shaft 26, which stabilizes the transmission 28, thus minimizing other NVH problems such as gear rattle and body boom.

The spring on the latching mechanism 60 is preferably sized to allow the pin to slide out of the latching slots 78 at about 600 to 1000 RPMs, and more preferably at about 800 RPMs, although the particular rotational velocity selected for unlatching may vary depending upon various engine, driveline, and vehicle parameters.

Figure 6:
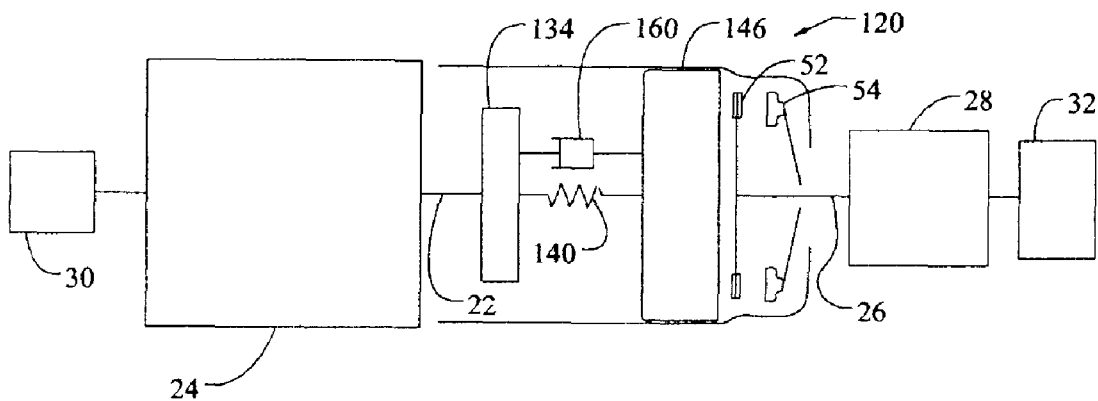
FIG. 6 is a schematic diagram similar to FIG. 1, but illustrating a second embodiment of the present invention.
Figure 7:
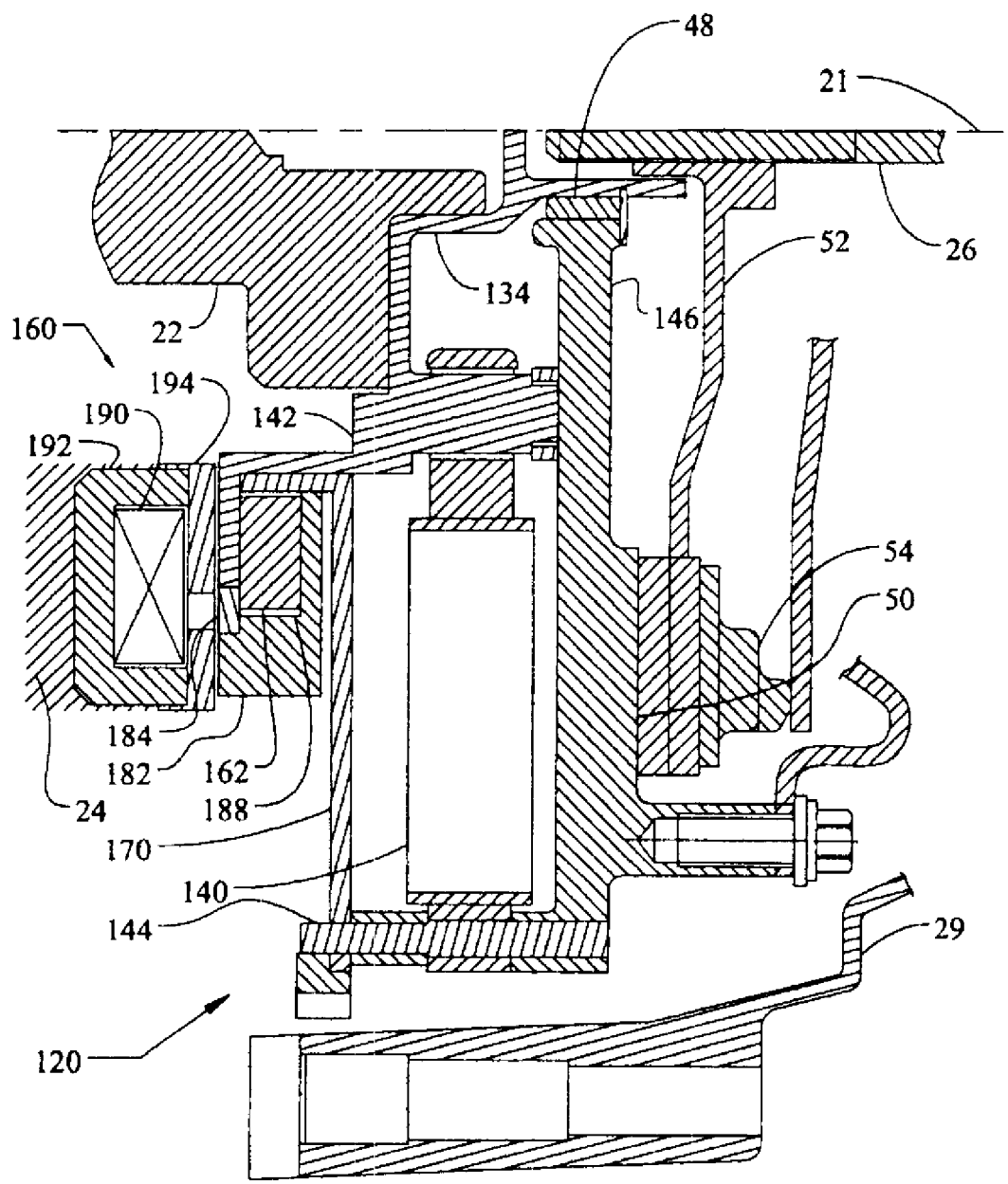
FIG. 7 is a partial cross-sectional view of a flywheel and clutch assembly in accordance with the second embodiment of the present invention.
Figure 8:
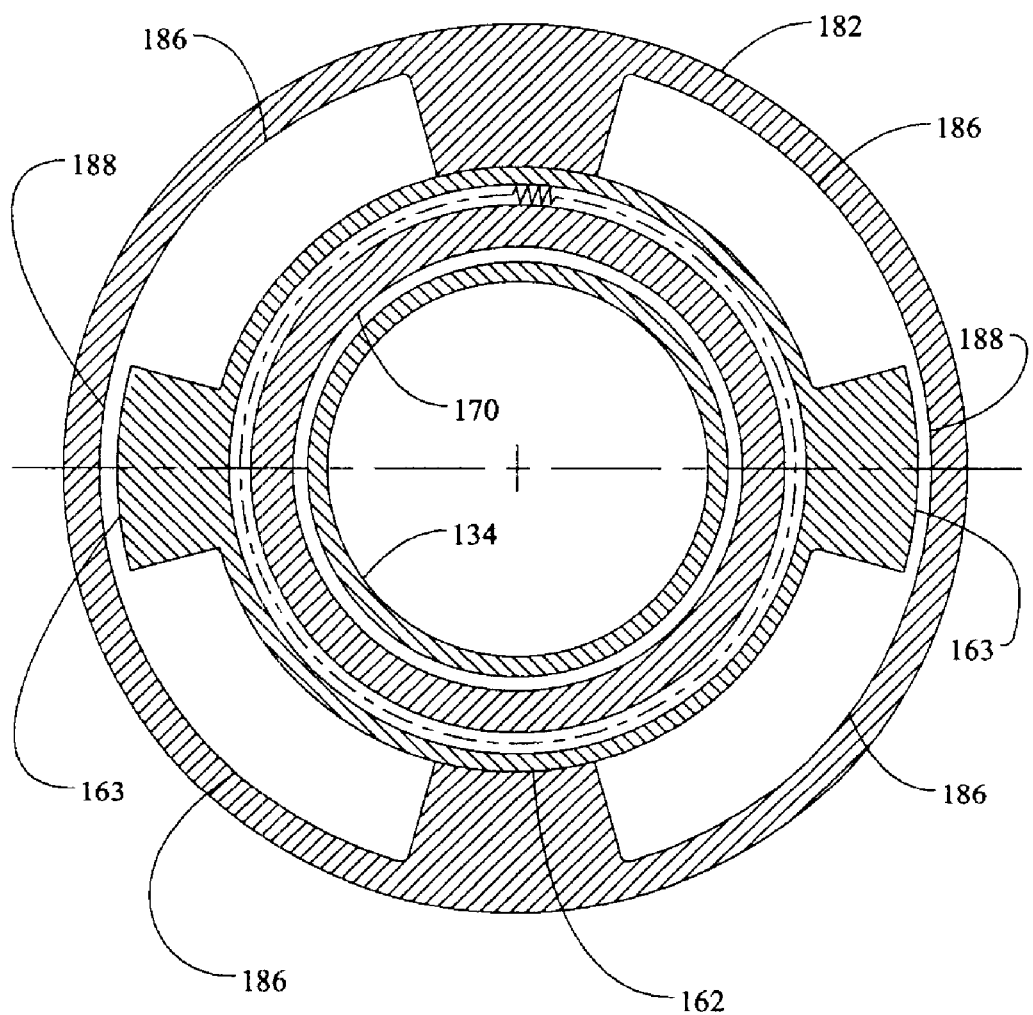
FIG. 8 is a schematic, elevation view of a portion of a variable damper/latch assembly in accordance with the second embodiment of the present invention.

FIGS. 6–8 illustrate a flywheel and clutch assembly 120 in accordance with a second embodiment of the present invention. In this embodiment, elements that are the same as the first will be designated with the same element numbers, but those that have changed or have been added will be designated with 100 series numbers. The engine 24, FEAD 30, crankshaft 22, clutch disc assembly 52, pressure plate 54, transmission input shaft 26, transmission 28 and remainder of the driveline 32 are the same as in the first embodiment.

The flywheel and clutch assembly 120 has a primary flywheel mass 134 that is bolted to the crankshaft 22. The radially inner end of the radial spring assemblies 140 are connected to the primary mass 134 via inner drive pins 142, while the radially outer ends of the spring assemblies 140 are connected to the secondary flywheel mass 146 via outer drive pins 144. The radially inner portion of the secondary mass 146 is again mounted about the primary mass 134 via the bearing 48. The secondary mass 146 again includes a friction face 50, which is shaped to engage with the face of a clutch disc assembly 52. This clutch disc assembly 52 is again mounted to the transmission input shaft 26.

A damper latching mechanism 160 couples between the primary mass 134 and the secondary mass 146. In this embodiment, the latching mechanism 160 not only serves to latch the secondary mass 146 to the primary mass 134, but also can be electronically controlled to act as a torsional damper connected in parallel with the radial spring assemblies 140.

This latching mechanism 160 includes a vane disk 162, which includes a pair of vane portions 163. The vane disk 162 is splined to a generally ring shaped member 170 of the secondary mass 146. The vane disk 162 is mounted adjacent to a fluid housing 182, which is rotationally fixed to the primary mass 134 via a ring shaped, non-magnetic spacer 184. Together, the vane disk 162, and the fluid housing 182 and spacer 184 define four fluid chambers 186, and two channels 188 that each connect a respective two of the fluid chambers 186. The fluid channels 188 are preferably about 0.6 millimeters wide and about 0.6 millimeters high. The fluid chambers 186 and channels 188 are filled with a magnetorheological (MR) fluid. The vane disk 162 and fluid housing 182 are made from a ferrous material, while the spacer 184 is made of a nonferrous material.

A wire coil 190 and coil housing 192 are mounted to the engine 24. A slotted cover 194 mounts to the coil housing 192 and is spaced apart from the primary mass 134, spacer 184 and fluid housing 182 by an approximately 0.5 millimeter air gap.

The operation of the second embodiment will now be described. The engine 24 drives the crankshaft 22, which in turn drives the primary mass 134. By driving the primary mass 134, this causes the housing 182 to rotate, which in turn causes the MR fluid to be pumped through the two channels 188 between the fluid cavities 186. The channels 188, then, in effect act like fluid valves that control the flow of MR fluid between the fluid chambers 186. It is the flowing of fluid through the channels 188 that allows for the rotation of the secondary mass 146 relative to the primary mass 134—up to the point where the vanes 163 contact the fluid housing 182, preventing further rotation in that direction. This flow of the viscous MR fluid through these channels 188 causes viscous damping to occur as the torque is transferred from the primary mass 134 to the secondary mass 146. The radial spring assemblies 140 also transfer torque from the primary mass 134 to the secondary mass 146 in parallel with the latch assembly 160. The torque is then transferred through the rest of the vehicle driveline in the same way as in the first embodiment.

The magnetic field in the chambers 186 and the channels 188 is controlled by supplying electrical current to the coil 190. When there is little or no current supplied to the coil 190, the magnetic field is zero or very small and so the viscosity of the MR fluid is relatively low. This allows a relatively free flow of MR fluid through the channels 188 between the fluid chambers 186, which, in turn, allows for some relative rotation between the primary mass 134 and the secondary mass 146 as the torque is transferred. A relatively small amount of damping occurs under this operating condition.

At full power supplied to the coil 190, the magnetic field is relatively high, causing the viscosity of the MR fluid to be very high such that it will not flow through the channels 188. Thus, at the highest energy level of the coil, the primary mass 134 is effectively latched to the secondary mass 146, and the two rotate together as one mass. At this viscosity level, none of the torque is transferred through the spring assemblies 140. Preferably, the latch assembly 160 is configured to act as a latch when the coil 190 is supplied with about ten volts, and so below ten volts it will operate as a damper in parallel with the radial spring assembly. Although the latch assembly 160 may be configured to operate over a different range of voltages if so desired.

Between zero (or very low power) and full power supplied to the coil 190, the viscosity of the MR fluid is relatively high, but some of the MR fluid can still flow through the channels 188, allowing for variable torsional damping between the primary mass 134 and the secondary mass 146. By varying the voltage supplied to the coil 190, and thus the strength of the resulting magnetic field, one can then selectively vary the viscosity of the MR fluid. Since the viscosity of the MR fluid is what determines the amount of damping, the variability of the MR fluid viscosity allows for variable damping. This variability allows for the amount of damping and the RPMs at which the latching assembly 160 latches to be controlled independent of or as a function of the engine RPMs, thus allowing for greater flexibility in controlling the NVH concerns for the engine and transmission.

Of course, there can be other configurations and orientations for forming the cavities and for the mounting location of the coil, as the particular packaging and size considerations are taken into account for a particular vehicle.

While certain embodiments of the present invention have been described in detail, those familiar with the art to which this invention relates will recognize various alternative designs and embodiments for practicing the invention as defined by the following claims.

What is claimed is:

1. A flywheel and clutch assembly for transferring torque from an engine crankshaft to a transmission input shaft, the assembly comprising:

a primary mass adapted to be rotationally fixed to the engine crankshaft;

a clutch disc adapted to be rotationally fixed to the transmission input shaft;

a secondary mass rotationally engageable with the clutch disc for transferring torque thereto;

a spring assembly coupled between the primary mass and the secondary mass; and a latcher connected between the primary mass and the secondary mass that is engageable to rotationally fix the primary mass to the secondary mass, and wherein the latcher includes a pair of cavities and a channel extending between the cavities defined be a first member, which forms a portion of the primary mass, and a second member, which forms a portion of the secondary mass, with the latcher further including a magnetorheological fluid contained within the cavities and channel that has a selectively variable viscosity, and with the latcher including a viscosity means, having an electromagnetic coil adjacent to the cavities and the channel, for selectively causing the viscosity of the fluid to change.

2. The assembly of claim 1 wherein the secondary mass has a significantly higher rotational moment of inertia than the primary mass.

3. The assembly of claim 1 wherein the spring assembly is a set of radial springs having a radial inner end and a radial outer end, with one of the primary and the secondary masses rotationally fixed to the inner end and the other of the primary and the secondary masses rotationally fixed to the outer end.

4. The assembly of claim 1 wherein the predetermined rotational velocity for causing the latcher to rotationally fix the primary mass to the secondary mass is about 600 to 1000 RPMs.

5. The assembly of claim 1 wherein the viscosity of the viscous fluid is selectively variable over a range of viscosities such that the latcher acts as a damper when the viscosity is below a predetermined level and acts as a latch, rotationally fixing the primary mass and the secondary mass, when the viscosity is at or above the predetermined level.

6. The assembly of claim 1 wherein when the coil is supplied with at least about 10 volts, then a magnetic field induced by the coil will increase the viscosity of the magnetorheological fluid to the predetermined level to act as a latch, and when the coil is supplied with less than about 10 volts, the viscosity of the magnetorheological fluid is below the predetermined level, causing the latcher to act as a damper between the primary mass and the secondary mass.

7. The assembly of claim 1 wherein the secondary mass includes a generally circular, radially outer periphery, and the periphery includes a set of gear teeth adapted to be engageable with an engine starter motor.

8. A flywheel and clutch assembly for transferring torque from an engine crankshaft to a transmission input shaft, the assembly comprising;
   a primary mass adapted to be rotationally fixed to the engine crankshaft:
   a clutch disc adapted to be rotationally fixed to the transmission input shaft;
   a secondary mass rotationally engageable with the clutch disc for transferring torque thereto;
   a spring assembly coupled between the primary mass and the secondary mass; and
   a latcher connected between the primary mass and the secondary mass that is engageable to rotationally fix the primary mass to the secondary mass, the latcher including a pair of cavities and a channel extending between the cavities defined by a first member, which forms a portion of the primary mass, and a second member, which forms a portion of the secondary mass, with the latcher further including a viscous fluid contained within the cavities and channel that has a selectively variable viscosity, and with the latcher including a viscosity means for selectively causing the viscosity of the fluid to change.

9. The assembly of claim 8 wherein the viscosity of the viscous fluid is selectively variable over a range of viscosities such that the latcher acts as a damper when the viscosity is below a predetermined level and acts as a latch, rotationally fixing the primary mass and the secondary mass, when the viscosity is at or above the predetermined level.

10. The assembly of claim 8 wherein the viscous fluid is a magnetorheological fluid, and the viscosity means includes an electromagnetic coil adjacent the cavities and the channel.

11. A vehicle driveline comprising:
   an engine crankshaft;
   a transmission input shaft; and
   a flywheel and clutch assembly including a primary mass rotationally fixed to the engine crankshaft, a clutch disc rotationally fixed to the transmission input shaft, a secondary mass rotationally engageable with the clutch disc for transferring torque thereto, a spring assembly coupled between the primary mass and the secondary mass, and a latcher connected between the primary mass and the secondary mass that is engageable to rotationally fix the primary mass to the secondary mass, the latcher including a pail of cavities and a channel extending between the cavities defined by a first member, which forms a portion of the primary mass, and a second member, which forms a portion of the secondary mass, with the latcher further including a viscous fluid contained within the cavities and channel that has a selectively variable viscosity, and with the latcher including a viscosity means for selectively causing the viscosity of the fluid to change.

12. The vehicle driveline of claim 11 wherein the secondary mass has a significantly higher rotational moment of inertia than the primary mass.

* * * * *